United States Patent
K et al.

(10) Patent No.: US 11,740,894 B2
(45) Date of Patent: Aug. 29, 2023

(54) BUILD-INDEPENDENT SOFTWARE FRAMEWORK FOR CREATING CUSTOM ADAPTERS

(71) Applicant: SAP SE, Walldorf (DE)

(72) Inventors: Shankara Prasad K, Puttur (IN); Gopalkrishna Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 50 days.

(21) Appl. No.: 17/690,288

(22) Filed: Mar. 9, 2022

(65) Prior Publication Data
US 2023/0236828 A1    Jul. 27, 2023

(30) Foreign Application Priority Data
Jan. 25, 2022    (IN) .............................. 202211004160

(51) Int. Cl.
*G06F 8/71*    (2018.01)
*G06F 8/60*    (2018.01)
*G06F 8/33*    (2018.01)

(52) U.S. Cl.
CPC .................. *G06F 8/71* (2013.01); *G06F 8/33* (2013.01); *G06F 8/60* (2013.01)

(58) Field of Classification Search
CPC .................. G06F 8/33; G06F 8/60; G06F 8/71
See application file for complete search history.

(56) References Cited

U.S. PATENT DOCUMENTS

| | | | |
|---|---|---|---|
| 7,007,063 B2 * | 2/2006 | Creamer | H04Q 3/0029 709/240 |
| 10,459,698 B2 * | 10/2019 | Kulkarni | G06F 8/433 |
| 10,742,613 B2 * | 8/2020 | Kulkarni | H04L 63/04 |
| 11,487,595 B2 * | 11/2022 | Take | G06F 8/311 |
| 2004/0187095 A1 * | 9/2004 | Gilfix | H04L 69/18 717/103 |
| 2007/0074158 A1 * | 3/2007 | Robinson | G06F 8/00 717/110 |
| 2017/0052780 A1 * | 2/2017 | Clevenger | G06F 8/36 |
| 2017/0102925 A1 * | 4/2017 | Ali | G06F 8/30 |
| 2018/0096053 A1 * | 4/2018 | Panwar | G06F 16/25 |
| 2020/0244772 A1 * | 7/2020 | Luo | H04L 67/10 |

* cited by examiner

*Primary Examiner* — Douglas M Slachta
(74) *Attorney, Agent, or Firm* — Buckley, Maschoff & Talwalkar LLC

(57) ABSTRACT

According to some embodiments, methods and systems may be associated with a cloud computing environment having an integration service (e.g., associated with a Software-as-a-Service or a Platform-as-a-Service). The system may include a build automation tool and a build-independent software framework coupled to the build automation tool. The build-independent software framework may access, via an implementation registry, information from the build automation tool that represents a custom adapter for the integration service. The build-independent software framework may then automatically create the custom adapter via a build Application Programming Interface ("API") and automatically validate the created custom adapter via a validation API. The system can then arrange to deploy a concrete implementation of the custom adapter in the cloud computing environment. According to some embodiments, the software framework is "build-independent" because it does not require that an adapter designer use a particular Integrated Development Environment ("IDE").

20 Claims, 10 Drawing Sheets

BUILD-INDEPENDENT SOFTWARE FRAMEWORK FOR CREATING CUSTOM ADAPTERS

CROSS-REFERENCE TO RELATED APPLICATION

This application is related to, and claims benefit of and priority to, Indian Provisional Patent Application No. 202211004160, filed Jan. 25, 2022, the contents of which are hereby incorporated by reference in their entirety for all purposes.

BACKGROUND

An enterprise may utilize a cloud computing environment to let users perform tasks. For example, the enterprise might let various users execute an application via the cloud computing environment to process purchase orders, adjust human resources information, generate invoices, etc. In a Graphical User Interface ("GUI") based multi-tenant integration service 150, such as SAP® Cloud Platform Integration ("CPI"), an integration developer can drag-and-drop integration components to create integration scenarios or flows including adapters (e.g., at the sender or receiver side of an integration flow). In integration development, a quick and easy way of adding new adapters may be highly desirable. Since not all adapters can be developed by a platform, a framework may be provided to external developers to let them add custom adapters for the platform. Most of the frameworks have a build or Integrated Development Environment ("IDE") dependency. As used herein, the phrase "IDE" may refer to a software application that provides comprehensive facilities to computer programmers for software development (e.g., a source code editor, build automation tools, a debugger, etc.). For example, a particular Adapter Development Kit ("ADK") framework might have a dependency on eclipse. This means that a developer will need to learn eclipse IDE constraints. This enforces IDE as a choice for all developers, which may not be productive and may substantially increase the Total Cost of Ownership ("TCO") for an adapter. Another problem is that the framework owner may need to continually support the latest versions of the IDE in order to remain compatible. This, however, can be a time-consuming and error-prone task— especially when there are a substantial number of integration components, custom adapters, etc.

It would therefore be desirable to provide a quick and easy way of adding new custom adapters for an integration service in a cloud computing environment via a build-independent framework.

SUMMARY

According to some embodiments, methods and systems may be associated with a cloud computing environment having an integration service (e.g., associated with a Software-as-a-Service or a Platform-as-a-Service). The system may include a build automation tool and a build-independent software framework coupled to the build automation tool. The build-independent software framework may access, via an implementation registry, information from the build automation tool that represents a custom adapter for the integration service. The build-independent software framework may then automatically create the custom adapter via a build Application Programming Interface ("API") and automatically validate the created custom adapter via a validation API. The system can then arrange to deploy a concrete implementation of the custom adapter in the cloud computing environment. According to some embodiments, the software framework is "build-independent" because it does not require that an adapter designer use a particular Integrated Development Environment ("IDE").

Some embodiments comprise means for accessing, via an implementation registry and a computer processor of a build-independent software framework, information from a build automation tool that represents a custom adapter for the integration service; means for automatically creating the custom adapter via a build Application Programming Interface ("API"); means for automatically validating the created custom adapter via a validation API; and means for arranging to deploy a concrete implementation of the custom adapter in the cloud computing environment.

Some technical advantages of some embodiments disclosed herein are improved systems and methods to provide a quick and easy way of adding new custom adapters for an integration service in a cloud computing environment via a build-independent framework.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a cloud computing landscape, stand-alone, individual applications may exchange information via an integration service. For example, in a GUI-based integration service (such as SAP® CPI), an integration developer drags-and-drops integration components to create an integration service. Cloud integration is the act of combining different cloud-based systems into an integral whole, or may refer to the joining of cloud-based systems with on-premises systems. The ultimate goal of cloud integration is to connect the disparate elements of various cloud and local resources into a single, ubiquitous environment that allows administrators to seamlessly access and manage applications, data, services, and systems. A cloud integration platform may synchronize data and applications across an enterprise. Cloud integration may include data integration (sharing or synchronizing data between data stores) and application integration (two or more applications share states, requests, commands, and other mechanisms to implement organization processes).

Figure 1:
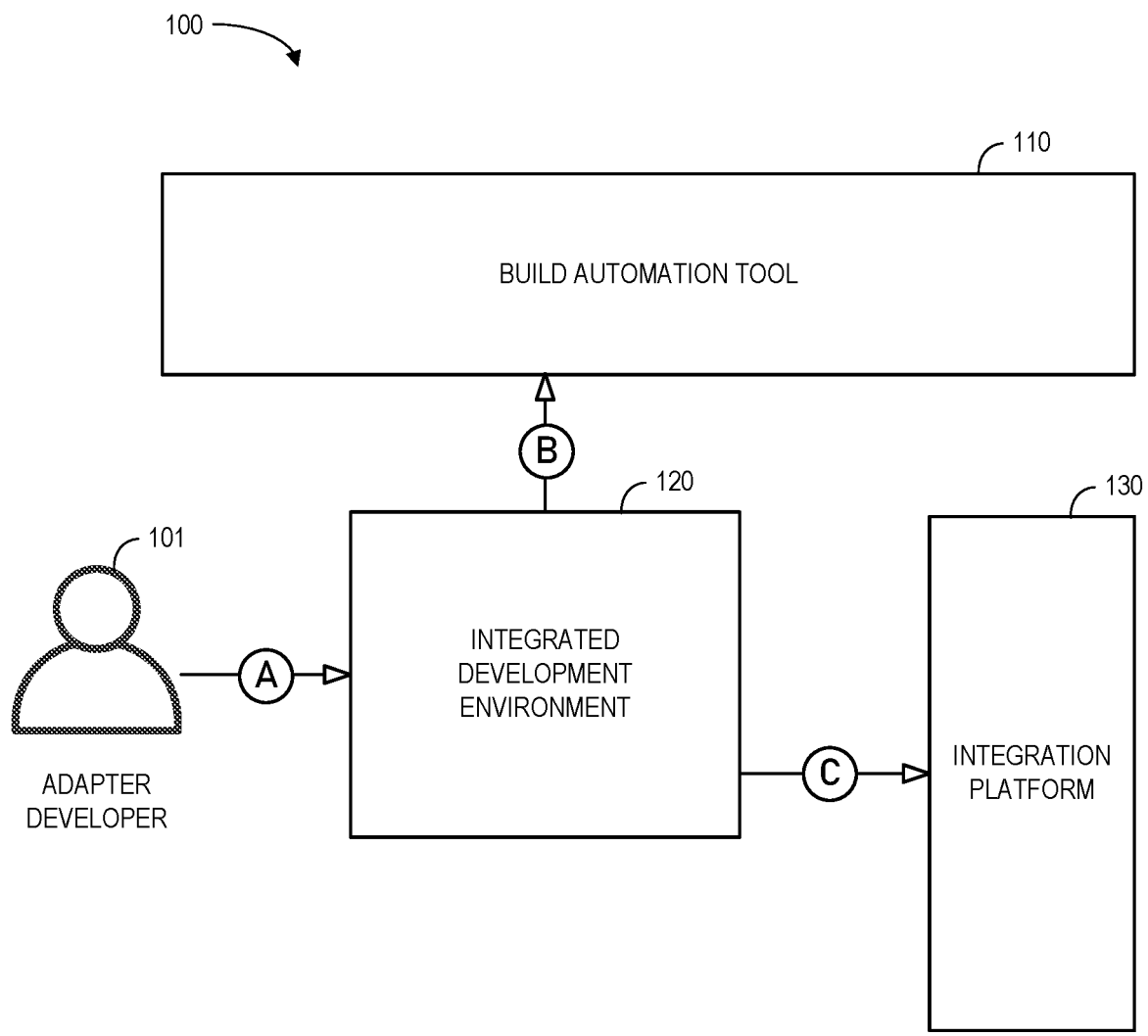
FIG. 1 is a high-level block diagram associated with a cloud-based computing system in accordance with some embodiments.

FIG. 1 is a high-level block diagram associated with a cloud-based computing system 100 in accordance with some embodiments. The system 100 may include a build automation tool 110. As used herein, the phrase "build automation tool" may refer to elements that help automate various tasks to develop source code into an end-product. These elements might include, for example, items for downloading dependencies, compiling source code into binary code (e.g., a machine-readable format), packaging binary code, running automated tests, code coverage, static code analysis, creating or updating database schema (migration), packaging the code into an executable format, deploying to production/testing/User Acceptance Testing ("UAT") environments, generating documentation from source code, etc.

At (A), an adapter developer 101 access an Integrated Development Environment ("IDE") 120 to create one or more custom adapters. As used herein, the phrase "IDE" may refer to, for example, a software application that provides comprehensive facilities to computer programmers for software development. The IDE 120 might include a source code editor, a debugger, a compiler, an interpreter, etc. The IDE 120 and build automation tool 110 may automatically work together at (B) to deploy the custom adapters to an integration platform 130 at (C). The term "automatically" may refer to a process that requires little or no human intervention. As used herein, the phrase "integration platform" may refer to software that helps integrate different applications and services. The integration platform 130 may provide an environment for data integration, data management with metadata information, application integration, collaboration between distributed and scattered applications and designers, interoperability between different operating systems and programming languages, implementation of security considerations, etc.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The build automation tool 110 and/or IDE 120 may store information into and/or retrieve information from various data stores (e.g., adapter configuration values), which may be locally stored or reside remote from the build automation tool 110 and/or IDE 120. Although a single build automation tool 110 and IDE 120 are shown in FIG. 1, any number of such devices may be included. Moreover, various devices described herein might be combined according to embodiments of the present invention. For example, in some embodiments, the build automation tool 110 and IDE 120 might comprise a single apparatus. The system 100 functions may be performed by a constellation of networked apparatuses, such as in a distributed processing or cloud-based architecture.

An administrator may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via the remote device (e.g., to define how microservices interact) and/or provide or receive automatically generated recommendations or results associated with the system 100.

Figure 2:
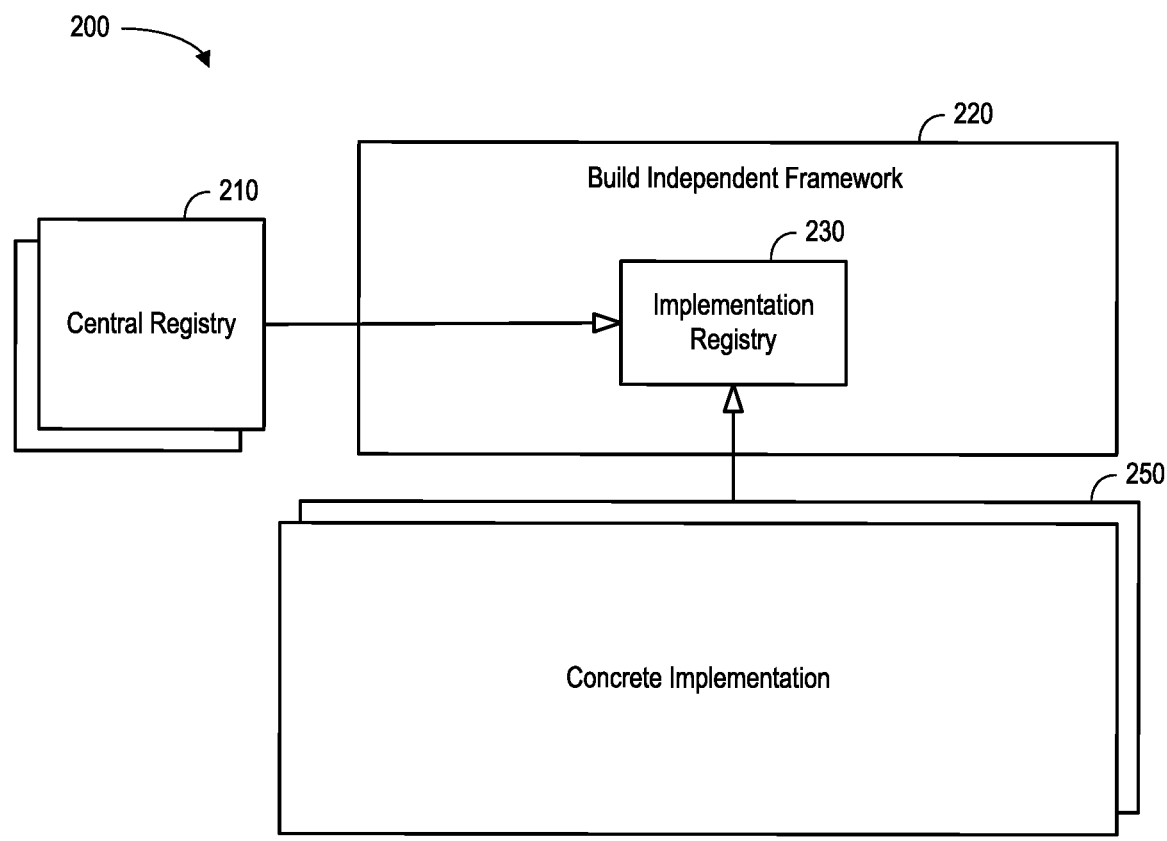
FIG. 2 is a custom adapter architecture according to some embodiments.

FIG. 2 is a custom adapter architecture 200 according to some embodiments. An implementation of a build-independent framework 220 may retrieve information about one or more custom adapters from a central registry 210 via an implementation registry 230. According to some embodiments, the framework 220 is "build-independent" because it does not require that an adapter designer use a particular IDE. The information in the implementation registry 230 may then be used to create concrete implementations 250 of the adapters.

Figure 3:
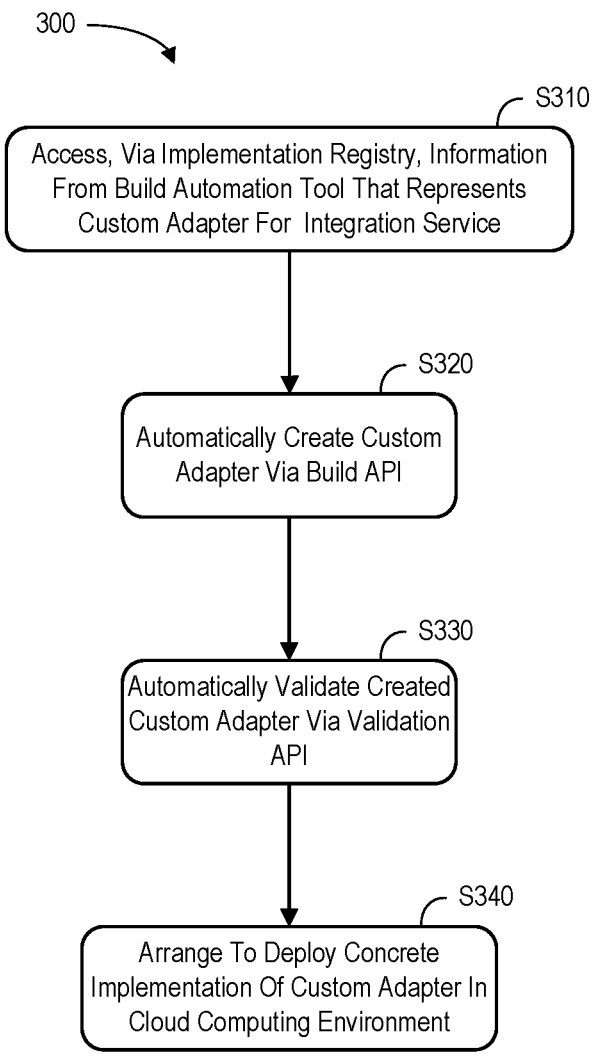
FIG. 3 is a custom adapter creation method in accordance with some embodiments.

FIG. 3 is a custom adapter creation method 300 that might be performed by some or all of the elements of the systems 100, 200 described with respect to FIGS. 1 and 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, an implementation registry and a computer processor of a build-independent software framework (e.g., does not require a specific IDE such as eclipse) may access information (from a build automation tool) that represents a custom adapter for an integration service. The integration service might be associated with, for example, a Software-as-a-Service or a Platform-as-a-Service. According to some embodiments, the build automation tool further includes build automation tool archetypes or templates. At S320, the system may automatically create the custom adapter via a build Application Programming Interface ("API"). The system may then automatically validate the created custom adapter via a validation API at S330. According to some embodiments, the build automation tool further includes a metadata generator to create metadata for the custom adapter required for User Interface ("UI") integration. At S340, the system may arrange to deploy a concrete implementation of the custom adapter in the cloud computing environment as appropriate.

Figure 4:
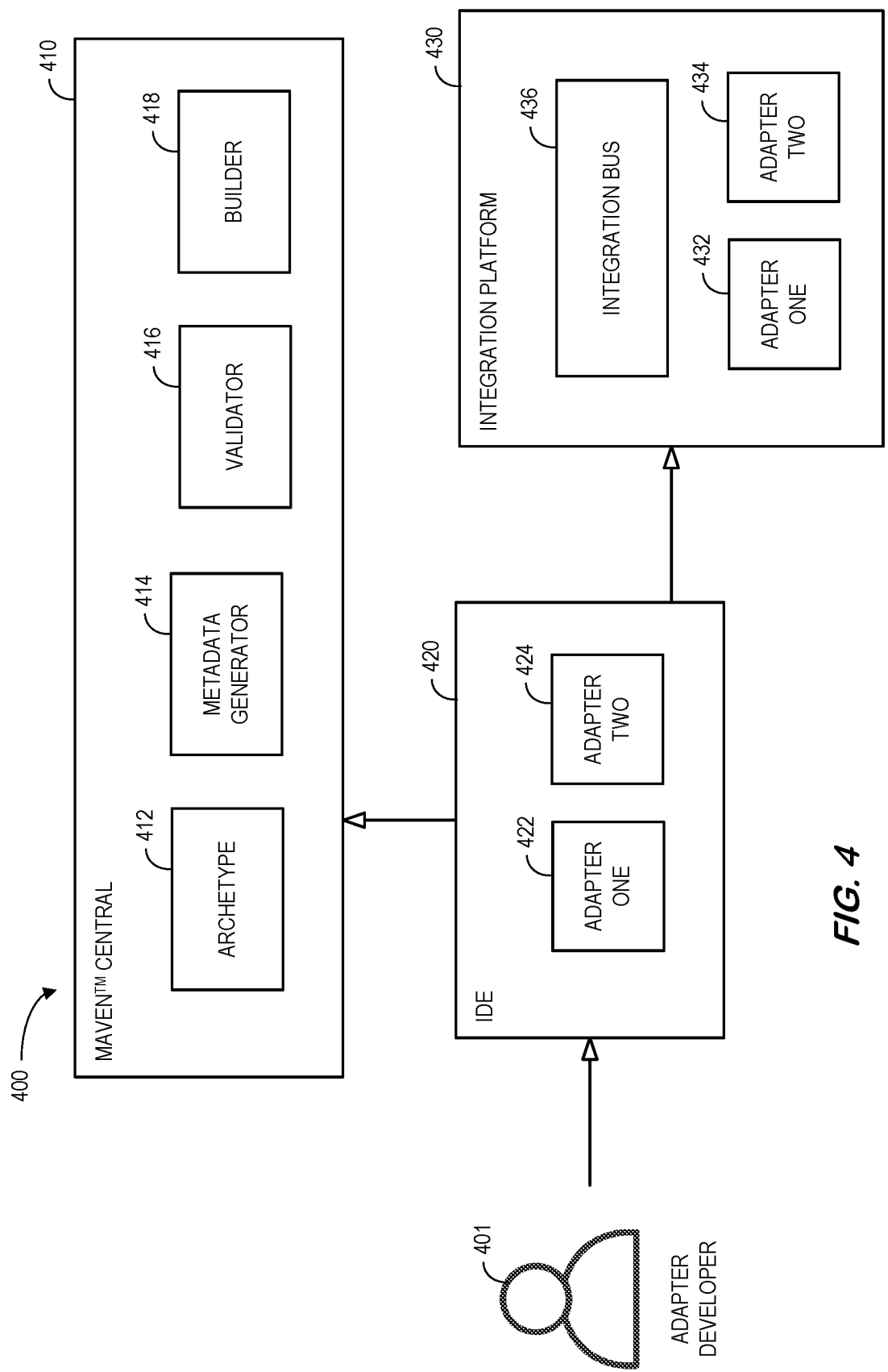
FIG. 4 is a more detailed block diagram associated with a cloud-based computing system according to some embodiments.

FIG. 4 is a more detailed block diagram associated with a cloud-based computing system 400 according to some embodiments. This example is associated with the APACHE MAVEN™ SOFTWARE build automation tool (e.g., for projects written in Java, C #, Ruby, etc.). Note, however, that embodiments might be associated with other build automation tools, such as Jenkins, Gradle, etc. The MAVEN™ build automation tool addresses how software is built and its dependencies and uses conventions for the build procedure (only exceptions need to be specified). An XML file describes the software project being built, its dependencies on other external modules and components, the build order, directories, required plug-ins, etc. The MAVEN™ build automation tool dynamically downloads Java libraries and MAVEN™ plug-ins from one or more repositories such as a MAVEN™ central 410 repository. The MAVEN™ central 410 may include MAVEN™ archetypes 412 to create different types of adapters. Developers can create either an adapter using an existing APACHE CAMEL™ SOFTWARE component, or they can create a new component from scratch. A metadata generator 414 may help create metadata for the adapter. The metadata is an integral part of a custom adapter which is required for User Interface ("UI") configuration. An adapter validator 416 may validate the asterisks of the adapter project (and also the metadata) to find any errors. A builder 418 may build the final deployable subsystem bundle.

In this way, an adapter developer 401 may create adapters 422, 424 in an IDE 420 (using the MAVEN™ central 410) and, according to some embodiments, deploy adapters 432, 434 in an integration platform 430. The integration platform 430 may, for example, include an integration bus 436 to let business information flow between disparate applications across multiple hardware and software platforms.

Figure 5:
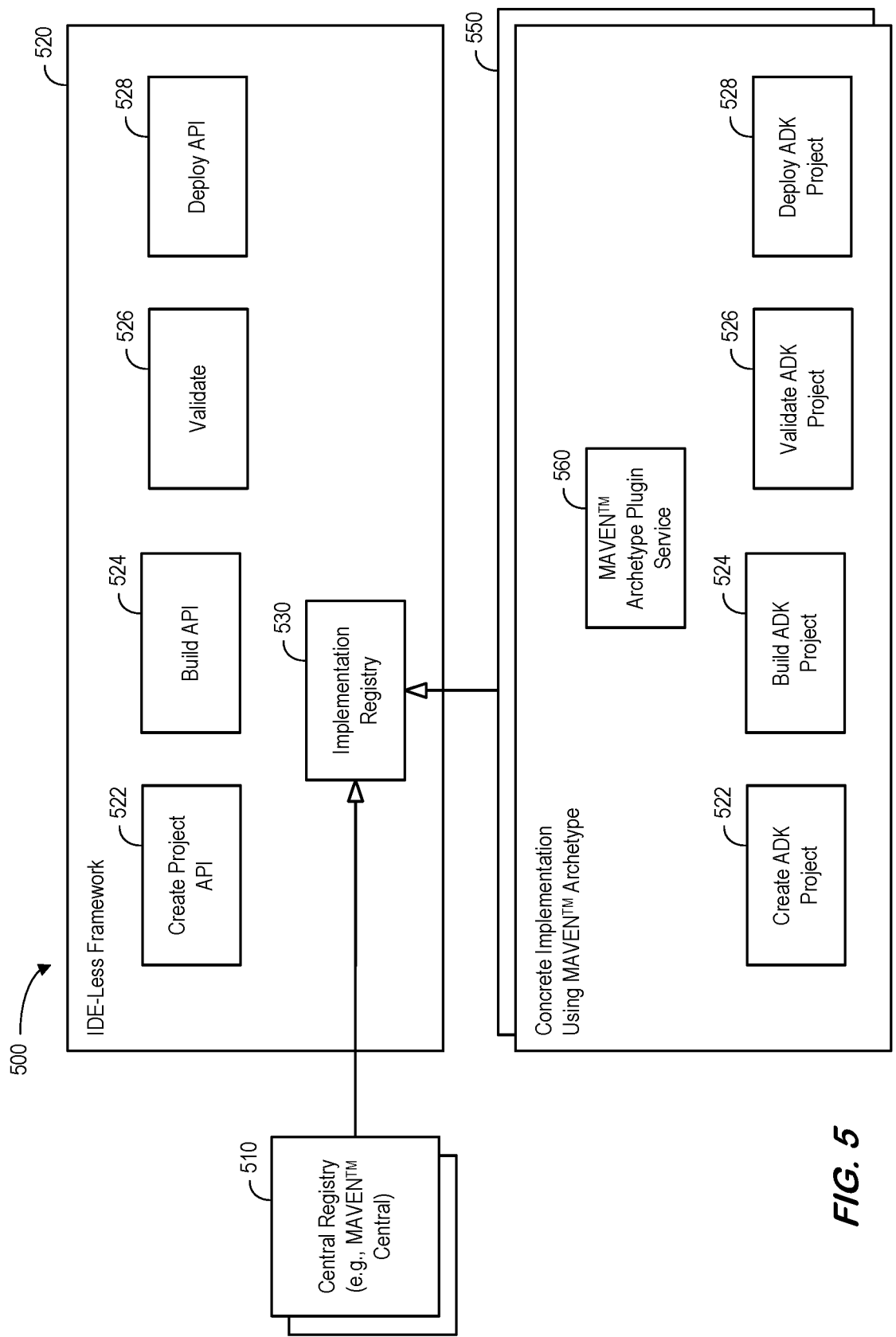
FIG. 5 is a more detailed custom adapter architecture in accordance with some embodiments.

FIG. 5 is a more detailed custom adapter architecture 500 in accordance with some embodiments. The system 500 includes an IDE-less framework 520 with a create-project API 522, a build API 524, a validate component 526, and a deploy API 528. An implementation registry 530 of the framework 520 may receive data from a central registry 510 (e.g., the MAVEN™ central 410 of FIG. 4). A concrete implementation using the MAVEN™ archetype 550 also accesses the implementation registry 530 and may include a MAVEN™ archetype plug-in service 560, a create ADK project 552, a build ADK project 554, a validate ADK project 556, and a deploy ADK project 558.

Figure 6:
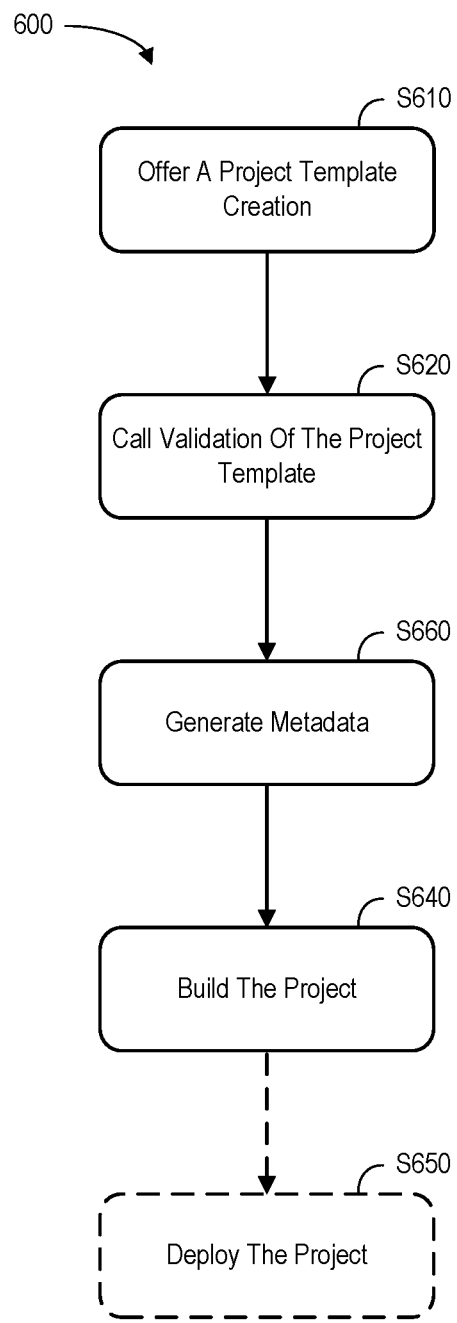
FIG. 6 is a custom adapter creation method according to some embodiments.

Generally, an ADK framework may implement a method 600 as illustrated in FIG. 6 according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S610, the system may offer project template creation to an adapter developer. At S620, the framework may call for the validation of the project template. The system may then automatically generate metadata at Sf630. The validated project can then be built by the framework at S640. At S650, the system may optionally deploy the project to complete the method 600 (as illustrated by dashed lines in FIG. 6).

In this way, embodiments may utilize the proposed framework to offer generic API usage by the framework owner. If they implement these APIs, the framework work will take care of creating IDE-independent modules. For example, embodiments may use a MAVEN™ archetype as the underlying construct to create an ADK project as appropriate. As a result, custom adapter development may be offered in an IDE-independent environment.

Figure 7:
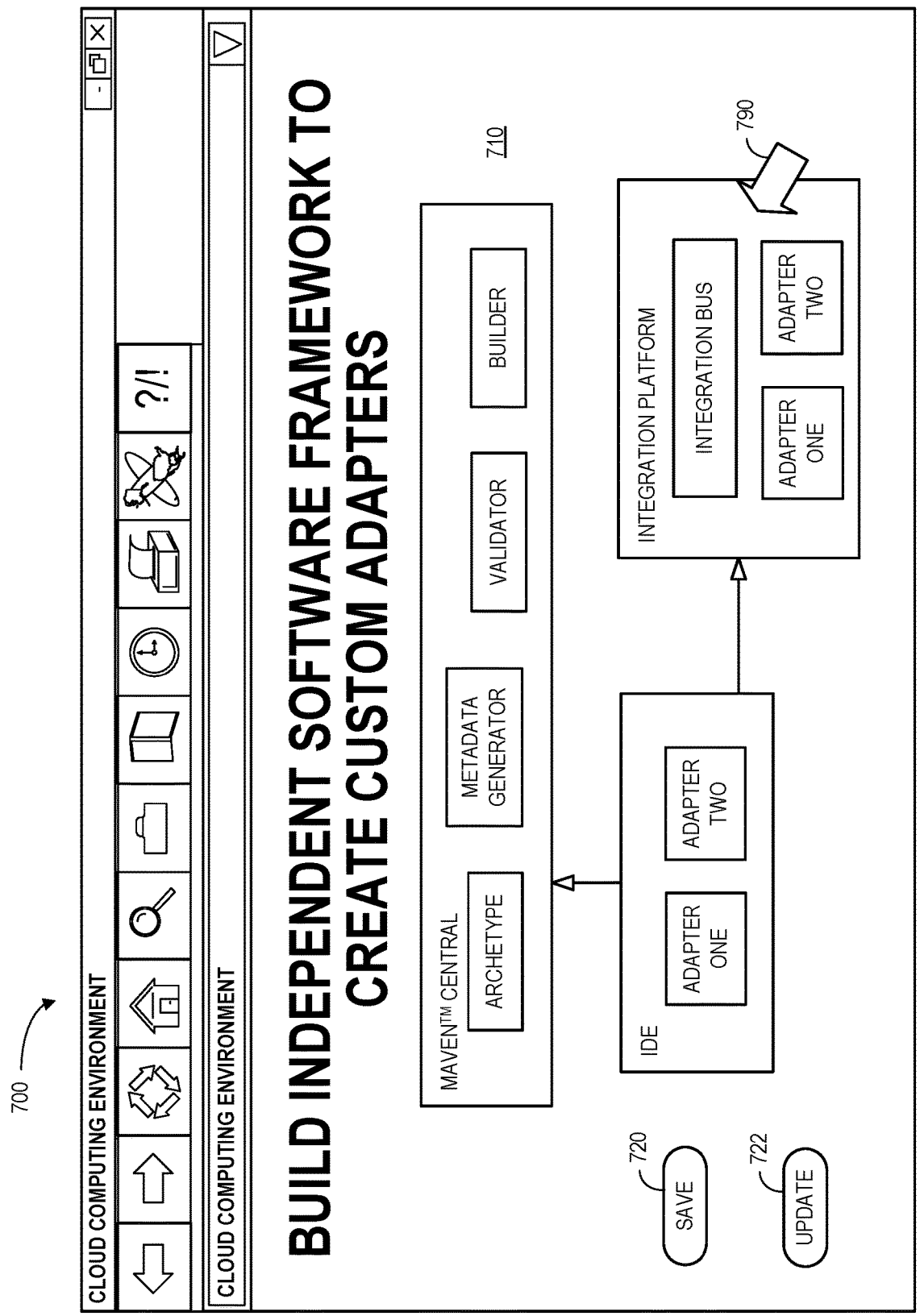
FIG. 7 is a custom adapter creation software framework display according to some embodiments.

FIG. 7 is a custom adapter creation software framework display 700 according to some embodiments. The display 700 includes a graphical representation 710 or dashboard that might be used to manage a build-independent software framework (e.g., for a multi-tenant cloud computing environment). In particular, selection of an element (e.g., via a touchscreen or computer mouse pointer 790) might result in the display of a popup window that contains more detailed data. The display 700 may also include a user selectable "Save" icon 720 to store custom adapter configurations and/or system mappings (e.g., to MAVEN™ central and/or an integration platform) and an "Update" icon 722 to adjust those values as appropriate.

Figure 8:
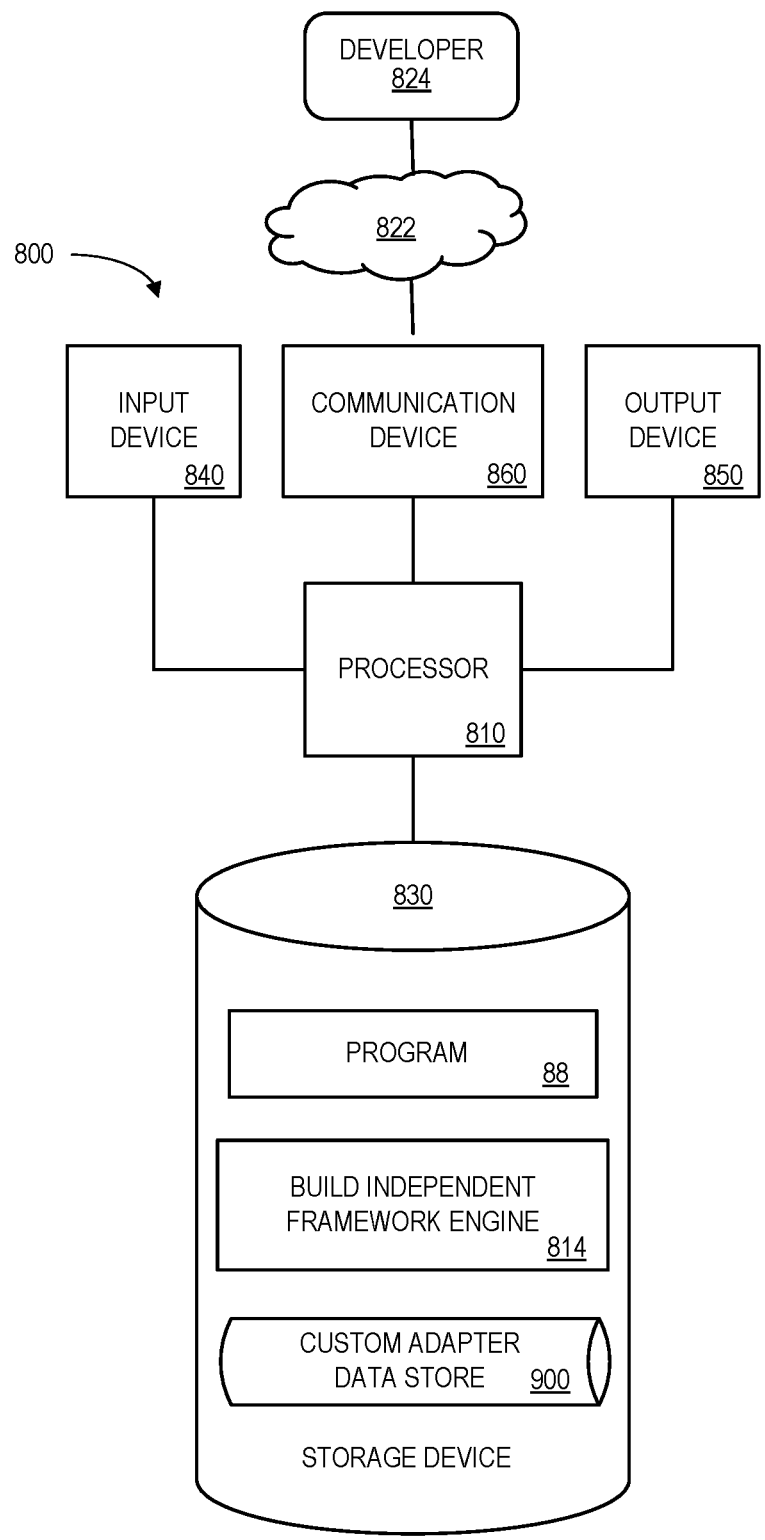
FIG. 8 is an apparatus or platform according to some embodiments.

Note that the embodiments described herein may be implemented using any number of different hardware configurations. For example, FIG. 8 is a block diagram of an apparatus or platform 800 that may be, for example, associated with the systems 100, 200, 400, and 500 of FIGS. 1, 2, 4, and 5, respectively (and/or any other system described herein). The platform 800 comprises a processor 810, such as one or more commercially available Central Processing Units ("CPUs") in the form of one-chip microprocessors, coupled to a communication device 860 configured to communicate via a communication network (not shown in FIG. 8). The communication device 860 may be used to communicate, for example, with one or more developers 824 (e.g., via a communication network 822), system administrators, etc. The platform 800 further includes an input device 840 (e.g., a computer mouse and/or keyboard to input, create and/or manage custom adapter information) and/or output device 850 (e.g., a computer monitor to render a display, transmit recommendations, and/or create reports about custom adapters, archetype templates, adapter designers, etc.). According to some embodiments, a mobile device and/or PC may be used to exchange information with the platform 800.

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or build-independent framework engine 814 for controlling the processor 810. The processor 810 performs instructions of the programs 812, 814, and thereby operates in accordance with any of the embodiments described herein. For example, the processor 810 may be associated with a cloud computing environment having an integration service (e.g., associated with a Software-as-a-Service or a Platform-as-a-Service). The processor 810 may include a build automation tool and a build-independent software framework coupled to the build automation tool. The build-independent software framework may access, via an implementation registry, information from the build automation tool that represents a custom adapter for the integration service. The processor 810 may then automatically create the custom adapter via a build API and automatically validate the created custom adapter via a validation API. The processor 810 can then arrange to deploy a concrete implementation of the custom adapter in the cloud computing environment. According to some embodiments, the software framework is "build-independent" because it does not require that an adapter designer use a particular IDE.

The programs 812, 814 may be stored in a compressed, uncompiled and/or encrypted format. The programs 812, 814 may furthermore include other program elements, such as an operating system, clipboard application, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

In some embodiments (such as the one shown in FIG. 8), the storage device 830 further stores a custom adapter data store 900. An example of a database that may be used in connection with the platform 800 will now be described in detail with respect to FIG. 9. Note that the database described herein is only one example, and additional and/or different information may be stored therein. Moreover, various databases might be split or combined in accordance with any of the embodiments described herein.

Figure 9:
FIG. 9 is a tabular portion of a custom adapter data store in accordance with some embodiments.

Referring to FIG. 9, a table is shown that represents the custom adapter data store 900 that may be stored at the platform 800 according to some embodiments. The table may include, for example, entries identifying custom adapters that have be created for a cloud computing environment. The table may also define fields 902, 904, 906, 908, 910 for each of the entries. The fields 902, 904, 906, 908, 910 may, according to some embodiments, specify a custom adapter identifier 902, a MAVEN™ archetype 904, configuration values 906, metadata 908, and a status 910. The custom adapter data store 900 may be created and updated, for example, when new integration adapters or scenarios are developed or updated, etc.

The custom adapter identifier 902 might be a unique alphanumeric label that is associated with the custom adapter for which configuration values have been defined for an integration scenario. The MAVEN™ archetype 904 might be associated with a template that was used to help create the custom adapter. The configuration values 906 define the integration component (custom adapter), and the metadata might include information about the custom adapter. The status 910 might indicate, for example, that a custom adapter has been deployed, is in the process of being developed, has been validated (or if any errors were detected during validation), etc.

Thus, embodiments may provide a quick and easy way of adding new custom adapters for an integration service in a cloud computing environment via a build-independent framework. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 10:
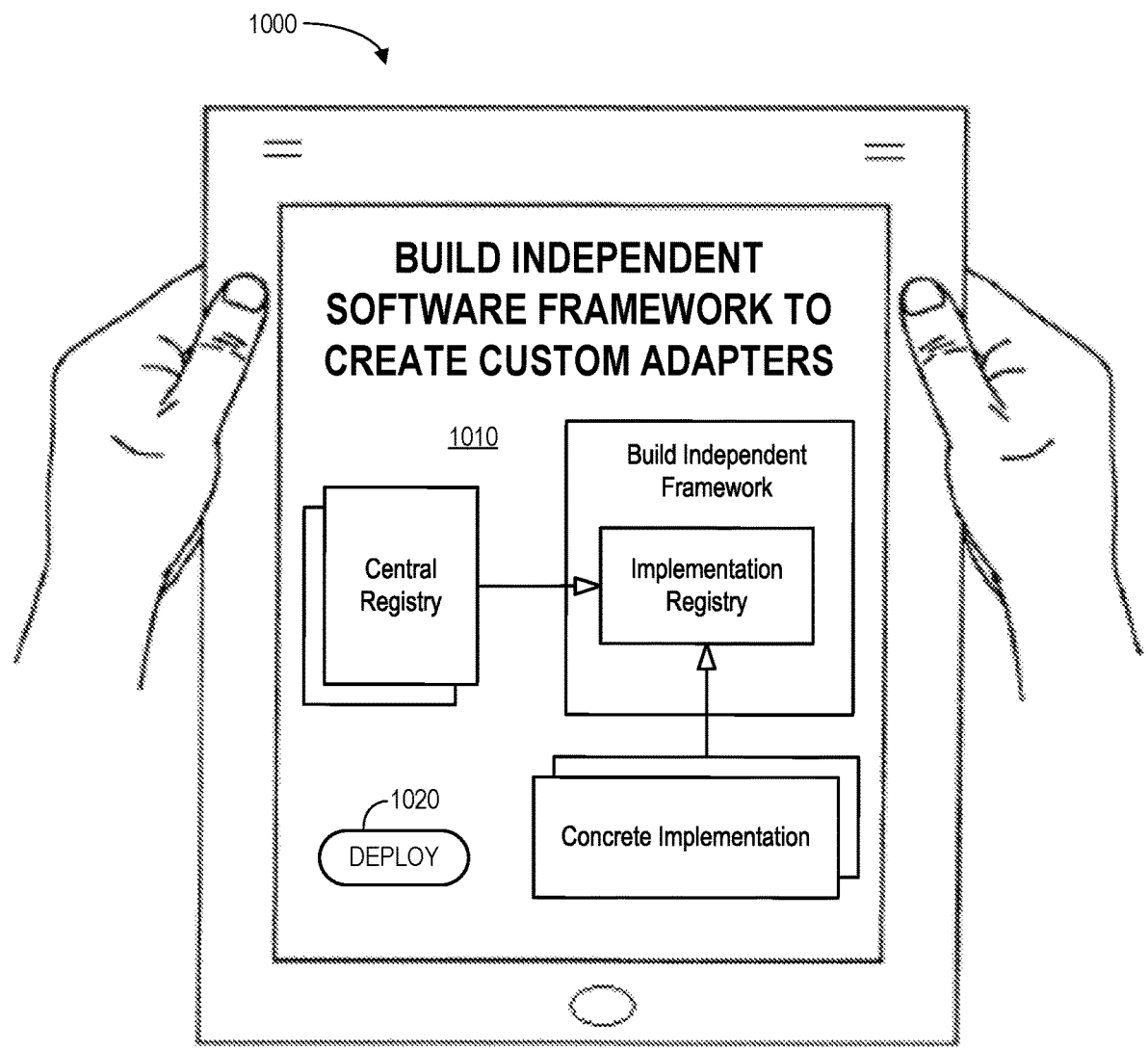
FIG. 10 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of adapters, integration services, IDEs, build automation tools, etc., any of the embodiments described herein could be applied to other types of applications. Moreover, the displays shown herein are provided only as examples, and any other type of user interface could be implemented. For example, FIG. 10 illustrates a tablet computer 1000 providing a build-independent software framework display 1010. The display 1010 might be used, for example, to create a custom adapter for a cloud computing environment. Moreover, the display 1010 might be used to update and/or create a concrete version of the adaptor via a "deploy" icon 1020 to provide a quick and easy way of adding new custom adapters for an integration service using a build (or IDE) independent framework.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a cloud computing environment having an integration service, comprising:
   a build automation tool; and
   a build-independent software framework, coupled to the build automation tool, including:
      a computer processor, and
      a computer memory storing instructions that, when executed by the computer processor, cause the build-independent software framework to:
         access, via an implementation registry, information from the build automation tool representing a custom adapter for the integration service,
         automatically create the custom adapter via a build Application Programming Interface ("API"),
         automatically validate the created custom adapter via a validation API, and
         arrange to deploy a concrete implementation of the custom adapter in the cloud computing environment.

2. The system of claim 1, wherein the software framework is build-independent because it does not require that an adapter designer use a particular Integrated Development Environment ("IDE").

3. The system of claim 1, wherein the build automation tool includes build automation tool archetypes.

4. The system of claim 3, wherein the build automation tool further includes a metadata generator to create metadata for the custom adapter required for User Interface ("UI") integration.

5. The system of claim 4, wherein the build automation tool further includes an adapter validator to analyze a custom adaptor project and the metadata for errors.

6. The system of claim 5, wherein the build automation tool further includes a builder to create a final deployable system bundle.

7. The system of claim 6, further comprising an integration platform with an integration bus for the final deployable system bundle.

8. The system of claim 1, wherein the build-independent software framework further includes:
   a create-project API,
   a build API,
   a validate API, and
   a deploy API.

9. The system of claim 1, wherein the integration service is associated with at least one of: (i) a Software-as-a-Service, and (ii) a Platform-as-a-Service.

10. A computer-implemented method associated with a cloud computing environment having an integration service, comprising:
   accessing, via an implementation registry and a computer processor of a build-independent software framework, information from a build automation tool representing a custom adapter for the integration service;
   automatically creating the custom adapter via a build Application Programming Interface ("API");
   automatically validating the created custom adapter via a validation API; and
   arranging to deploy a concrete implementation of the custom adapter in the cloud computing environment.

11. The method of claim 10, wherein the software framework is build-independent because it does not require that an adapter designer use a particular Integrated Development Environment ("IDE").

12. The method of claim 10, wherein the build automation tool includes build automation tool archetypes.

13. The method of claim 12, further comprising:
   creating metadata for the custom adapter required for User Interface ("UI") integration via a metadata generator in the build automation tool.

14. The method of claim 13, further comprising:
   analyzing a custom adaptor project and the metadata for errors via an adapter validator in the build automation tool.

15. The method of claim 14, further comprising:
   creating a final deployable system bundle via a builder in the build automation tool.

16. The method of claim 10, wherein the build-independent software framework further includes: (i) a create-project API, (ii) a build API, (iii) a validate API, and (iv) a deploy API.

17. The method of claim 10, wherein the integration service is associated with at least one of: (i) a Software-as-a-Service, and (ii) a Platform-as-a-Service.

18. A non-transitory, computer-readable medium storing instructions, that, when executed by a processor, cause the processor to perform a method associated with a cloud computing environment having an integration service, the method comprising:
   accessing, via an implementation registry and a computer processor of a build-independent software framework, information from a build automation tool that represents a custom adapter for the integration service;
   automatically creating the custom adapter via a build Application Programming Interface ("API");
   automatically validating the created custom adapter via a validation API; and
   arranging to deploy a concrete implementation of the custom adapter in the cloud computing environment.

19. The medium of claim 18, wherein the software framework is build-independent because it does not require that an adapter designer use a particular Integrated Development Environment ("IDE").

20. The medium of claim 18, wherein the build automation tool includes build automation tool archetypes.

* * * * *